(12) United States Patent
Yang et al.

(10) Patent No.: US 12,528,342 B2
(45) Date of Patent: Jan. 20, 2026

(54) INTELLIGENT AIR CURTAIN SYSTEM FOR BUSES BASED ON COMPUTER VISION TECHNOLOGY

(71) Applicants: Tianjin Chengjian University, Tianjin (CN); Xi'an University of Architecture and Technology, Xi'an (CN)

(72) Inventors: Bin Yang, Tianjin (CN); Xin Zhu, Tianjin (CN); Shuang Yang, Tianjin (CN); Zhiyu Song, Tianjin (CN); Minzhang Liu, Tianjin (CN); Yuwen You, Tianjin (CN)

(73) Assignees: Tianjin Chengjian University; Xi'an University of Architecture and Technology, Xi'an (CN)

( * ) Notice: Subject to any disclaimer, the term of this patent is extended or adjusted under 35 U.S.C. 154(b) by 376 days.

(21) Appl. No.: 18/476,329

(22) Filed: Sep. 28, 2023

(65) Prior Publication Data

US 2024/0109404 A1    Apr. 4, 2024

(30) Foreign Application Priority Data

Sep. 30, 2022    (CN) .......................... 202211205311.2

(51) Int. Cl.
*B60J 9/04*    (2006.01)
*B60H 1/00*    (2006.01)

(52) U.S. Cl.
CPC ............ *B60J 9/04* (2013.01); *B60H 1/00371* (2013.01); *B60H 1/00742* (2013.01); *B60H 1/00821* (2013.01)

(58) Field of Classification Search
CPC ............ B60H 1/00371; B60H 1/00742; B60H 1/00821; B60J 9/04
See application file for complete search history.

(56) References Cited

U.S. PATENT DOCUMENTS

2021/0078382 A1*    3/2021    Maeng .................... A61B 5/01

* cited by examiner

*Primary Examiner* — Allen R. B. Schult

(57) ABSTRACT

An intelligent air curtain system on buses based on computer vision technology is provided, the air curtain system includes a data collection system, an information processing system, a terminal control system, and a terminal broadcast system. The data collection system collects video information in a front area. The information processing system includes an object detection part, a safety judgment part, a return air volume monitoring part, a posture judgment part, and an information calculation part. The object detection part and the safety judgment part judge the safety of a driver. The posture judgment part determines whether a passenger wears a mask properly. The information calculation part is configured to calculate a facial temperature of the passenger and transmit the facial temperature to the terminal control system and the terminal broadcast system. The terminal control system is configured to control an air curtain. The terminal broadcast system is configured for reminder.

8 Claims, 3 Drawing Sheets

INTELLIGENT AIR CURTAIN SYSTEM FOR BUSES BASED ON COMPUTER VISION TECHNOLOGY

TECHNICAL FIELD

The disclosure relates to the field of intelligent transportation technology, in particular to an intelligent air curtain system for buses based on computer vision technology.

BACKGROUND

Bus has the advantages of convenience, wide popularity, and low price, which plays an important role in promoting the development of the city. With the continuous development of the city and population growth, the market demand for buses is also increasing, but with the normalization of the COVID-19 epidemic at this stage, buses, as an indispensable part of urban public transport, are facing tremendous pressure of epidemic prevention and control. The main transmission routes of COVID-19 are respiratory droplet transmission and contact transmission. As an important service group in urban public transport, bus drivers need to measure the temperatures of passengers, check health codes, and supervise coin operations in their daily work, the exposure risk of their daily work is extremely high and there is a huge risk of infection. Since the bus has the characteristics of high mobility, large passenger capacity, and dense space in an operation process, once the bus driver is infected, it is very easy to appear a risk of cross-infection with other passengers.

An existing bus cab protective door can play a physical protective role in preventing the spread of droplets to a certain degree while protecting the driving safety of the driver, but the bus cab protective door in different cities has different styles and cannot completely separate the space of the cab and the front door area. Therefore, the bus cab protective door cannot provide enough safety guarantee for the driver.

In addition, existing non-contact human body temperature measurement technologies include infrared temperature measurement and infrared thermal imaging temperature measurement. An infrared temperature measurement gun is the most common application device of the infrared temperature measurement technology, which has the advantages of convenient use, small size, and fast measurement, and it is also the main device for bus drivers to measure the temperatures of passengers, but the measurement accuracy of this technology is relatively poor, which is affected by many factors such as measurement distance, measurement environment and states of human bodies when measuring. The infrared thermal imaging temperature measurement technology can intuitively display a temperature measurement situation of multiple objects, which is widely used at entrances of large public spaces such as airports and stations with many people. However, due to the high cost and the large volume of an infrared thermal imager, it is not suitable for measuring the temperatures of passengers on buses.

SUMMARY

In order to solve the problems in the prior art, the disclosure provides an intelligent air curtain system for buses based on computer vision technology, which collects passenger information in a front door area of a bus in real-time, correspondingly turns on and turns off an air curtain, and adjusts a supply air angle in real-time based on a value change of a return air volume to resist cold air invasion, so as to provide safety protection for a bus driver during epidemic prevention and control.

In order to achieve the purpose, the disclosure provides the following technical solutions: an intelligent air curtain system for buses based on computer vision technology, including a data collection system, an information processing system, a terminal control system, and a terminal broadcast system.

The information collection system includes a front door opening-closing collection part, a camera, an air volume sensor, and an information storage part. The front door opening-closing collection part is configured to collect electronic signals (also referred to as front door opening-closing information) generated for opening and closing the front door in real-time. The camera is configured to capture passenger video information in the front door area of the bus in real-time. The passenger video information includes passenger position information and passenger posture information. The air volume sensor is configured to collect information of a return air volume of a return air box of an air curtain. The information storage part is configured to store the passenger video information captured by the camera and transmit the passenger video information to the information processing system.

The information processing system includes an object detection part, a safety judgment part, a return air volume monitoring part, a posture judgment part, and an information calculation part. The object detection part is configured to detect the passenger position information in the front door area of the bus in the passenger video information and transmit the passenger position information to the safety judgment part. The safety judgment part is configured to receive the electronic signals generated for opening and closing the front door, receive the passenger position information transmitted by the object detection part, determine safety state information of a driver, mark the safety state information as a safe state or a dangerous state, and transmit the safety state information to the terminal control system. The return air volume monitoring part is configured to receive the information of the return air volume transmitted by the air volume sensor in the return air box, monitor a value change of the return air volume in real-time, mark the return air volume as correction event information when the return air volume is not in a preset threshold range, and transmit the correction event information to the terminal control system; the posture judgment part is configured to determine the passenger posture information indicating that a passenger in the front door area does not wear a mask or does not wear the mask properly in the video information, and the posture judgment part is further configured to mark the passenger posture information as reminding event information and transmit the reminding event information to the terminal broadcast system. The information calculation part is configured to calculate a facial skin temperature of the passenger in the front door area, mark the facial skin temperature as warning event information when the facial skin temperature is greater than or equal to a preset value, and transmit the warning event information to the terminal broadcast system.

The terminal control system includes an air curtain opening-closing judgment part and a supply air angle adjustment part, the air curtain opening-closing judgment part is configured to receive the safe state or the dangerous state transmitted by the information processing system, and the air curtain opening-closing judgment part is further configured to turn off or turn on the air curtain. The supply air angle adjustment part is configured to receive the correction event information transmitted by the information processing and adjust a supply air angle of the air curtain.

The terminal broadcast system is configured to receive the reminding event information and the warning event information transmitted by the information processing system, and the terminal broadcast system is further configured to perform broadcasting based on the reminding event information and the warning event information.

In an embodiment, the information collection system includes a front door opening-closing collection part, a camera, the air volume sensor, and an information storage part. The front door opening-closing collection part is configured to collect the electronic signals generated for opening and closing the front door in real-time, and the front door opening-closing collection part is further configured to transmit the electronic signals to the information processing system. The camera is configured to capture the passenger video information in the front door area of the bus and transmit the passenger video information to the information storage part. The air volume sensor is configured to collect the information of the return air volume of the return air box after the air curtain is turned on, and the air volume sensor is further configured to transmit the information of the return air volume to the information processing system. The information storage part is configured to store the passenger video information in the front door area of the bus and transmit the passenger video information to the information processing system.

In an embodiment, the object detection part is configured to detect the passenger position information in real-time in the video information based on a YOLOv5 object detection algorithm and transmit the passenger position information to the safety judgment part.

In an embodiment, the safety judgment part is configured to receive electronic signals generated for opening and closing the front door, receive the passenger position information transmitted by the object detection part, determine safety state information of a driver, and transmit the safety state information to the terminal control system. The safety state information includes a safe state and a dangerous state. The safety judgment part is further configured to:
  when the front door opening-closing information indicates that the front door is opened, determine the safety state information of the driver as the dangerous state;
  when the front door opening-closing information indicates that the front door is closed and there is a passenger standing in the front door area, determine the safety state information of the driver as the dangerous state; and
  when the front door opening-closing information indicates that the front door is closed and there is no passenger standing in the front door area, determine the safety state information of the driver as the safe state.

In an embodiment, the return air volume monitoring part is configured to monitor a value change of the return air volume in real-time, mark the return air volume as correction event information when the return air volume is not in a preset threshold range, and transmit the correction event information to the terminal control system.

In an embodiment, the posture judgment part is configured to determine the passenger posture information indicating that the passenger in the front door area do not wear a mask or do not wear the mask properly in the video information, and the posture judgment part is further configured to mark the passenger posture information as reminding event information and transmit the reminding event information to the terminal broadcast system.

In an embodiment, the information calculation part uses Euler video magnification technology to magnify a face of the passenger in the video information and calculate the facial skin temperature of the passenger; the facial skin temperature is marked as the warning event information when the facial skin temperature is greater than or equal to the preset value, and the warning event information is transmitted to the terminal broadcast system. The preset value is 37.3 Celsius degrees (° C.).

In an embodiment, the air curtain opening-closing judgment part is configured to turn on the air curtain based on the dangerous state transmitted by the information processing system, and the air curtain opening-closing judgment part is further configured to turn off the air curtain based on the safe state transmitted by the information processing system.

In an embodiment, the supply air angle adjustment part is configured to receive the correction event information transmitted by the information processing and adjust a supply air angle of the air curtain based on the correction event information.

In an embodiment, the terminal broadcast system includes a voice broadcast part. The voice broadcast part is configured to receive the reminding event information transmitted by the information processing system and broadcast a voice message "Please wear a mask properly" based on the reminding event information.

In an embodiment, the terminal broadcast system further includes a voice warning part. The voice warning part is configured to receive the warning event information transmitted by the information processing system and broadcast a voice message "Abnormal body temperature" to the driver based on the warning event information.

In an embodiment, the terminal broadcast system further includes a video-image broadcast part. The video-image broadcast part is configured to broadcast image and video information of passenger features corresponding to the warning event information to the driver.

Compared with the related art, the disclosure has the following beneficial effects.

The disclosure provides an intelligent air curtain system for buses based on computer vision technology. The system includes a data collection system, an information processing system, a terminal control system, and a terminal broadcast system. The cost of an ordinary camera in the data collection system is much lower than that of a thermal imager in the infrared thermal imaging temperature measurement technology. The camera records the passenger video information in the front door area in real-time and the facial skin temperature of newly boarded passengers can be calculated through the information processing system. When a facial skin temperature of a passenger is greater than or equal to the preset value, the terminal broadcast system will issue a warning to the bus driver. The bus driver promptly detects and prevents feverish passengers from boarding the bus, thereby reducing a risk of epidemic transmission. The information processing system promptly turns on the air curtain based on the information of the bus driver manually opening the front door, and turns on or turns off the air curtain based on the passenger position information in the front door area, which effectively blocks a path of cross-infection between newly boarded passengers and the bus driver.

In an embodiment, the information processing system collects the value change of the return air volume based on the air volume sensor provided in the return air box. When the return air volume is not in the preset threshold range, the information processing system can adjust the supply air angle of the air curtain in real-time, which can effectively deal with a situation where the protection effect of the air curtain is reduced by the invasion of cold air outside the bus when the front door is opened.

In an embodiment, compared with the infrared temperature measurement guns used for temperature measurement in buses, the intelligent air curtain system of the disclosure can more accurately acquire the facial information of newly boarded passengers to analyze and calculate the facial skin temperature of passengers, while avoiding close contacts between newly boarded passengers and bus driver. The disclosure can achieve temperature measurement at a longer distance and realize the simultaneous measurement of multiple passengers.

DESCRIPTION OF REFERENCE NUMERALS

1—camera; 2—voice broadcast part; 3—supply air box; 4—return air inlet; 5—return air box.

DETAILED DESCRIPTION OF EMBODIMENTS

The disclosure will be further explained in conjunction with the accompanying drawings and specific implementation methods.

Figure 1:
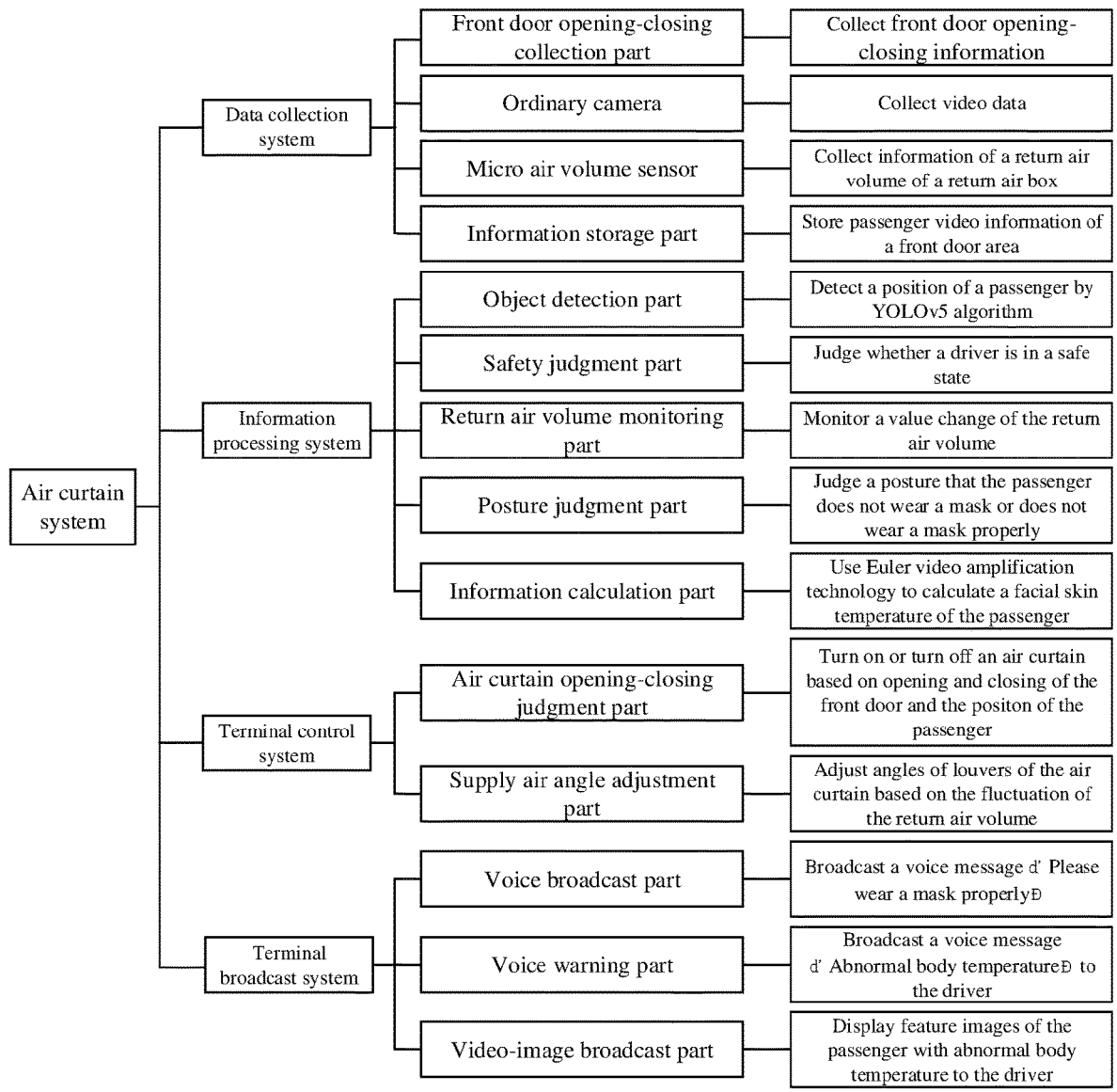
FIG. 1 illustrates a schematic composition diagram of an intelligent air curtain system for buses based on computer vision technology of the disclosure.

As shown in FIG. 1, the disclosure provides an intelligent air curtain system for buses based on computer vision technology. The intelligent air curtain system includes a data collection system, an information processing system, a terminal control system, and a terminal broadcast system.

1. The Data Collection System

The data collection system includes a front door opening-closing collection part, a camera 1 disposed at a top of the front door area, a micro air volume sensor (also referred to as an air volume sensor) disposed in a return air box 5, and an information storage part.

Specifically, the main function of the camera 1 is to capture passenger video information in the front door area of the bus. Multiple cameras 1 are connected to the information storage part through network cables to transmit the captured video information (i.e., the passenger video information) to the information storage part for storage. The information storage part is connected to the information processing system through network cables for transmitting the captured video information to the information processing system. The bus driver use electronic signals to opens and closes the front door based on an actual personnel situation at a bus stop, the front door opening-closing collection part collects the electronic signals used to open and close the front door in real-time, and sends the electronic signals to a safety judgment part of the information processing system through the network cables to determine the safety of the bus driver's epidemic prevention and control. The micro air volume sensor is configured to measure information of a return air volume of an return air box 5 after a supply air box 3 of the air curtain is turned on, and transmit the information of the return air volume to a return air volume monitoring part of the information processing system through network cables for monitoring and judging the fluctuation of the value of the return air volume.

2. Information Processing System

The information processing system includes an object detection part, a safety judgment part, a return air volume monitoring part, a posture judgment part, and an information calculation part.

Specifically, the object detection part is configured to detect the passenger position information in real-time based on a YOLOv5 object detection algorithm in the video information and transmit the passenger position information to the safety judgment part.

The safety judgment part is configured to receive electronic signals generated for opening and closing the front door, receive the passenger position information transmitted by the object detection part, determine safety state information of a driver, and transmit the safety state information to the terminal control system. The safety state information includes a safe state and a dangerous state. The safety judgment part is further configured to:
- when the front door opening-closing information indicates that the front door is opened, determine the safety state information of the driver as the dangerous state;
- when the front door opening-closing information indicates that the front door is closed and there is a passenger standing in the front door area, determine the safety state information of the driver as the dangerous state; and
- when the front door opening-closing information indicates that the front door is closed and there is no passenger standing in the front door area, determine the safety state information of the driver as the safe state.

The return air volume monitoring part is configured to receive the information of the return air volume transmitted by the micro air volume sensor in the return air box 5, monitor a value change of the return air volume in real-time, mark the return air volume as correction event information when the return air volume is not in a preset threshold range, and transmit the correction event information to a supply air angle adjustment part of the terminal control system.

The posture judgment part uses a YOLOv5 object detection algorithm to determine the passenger posture information. When the passenger does not wear the mask or does not wear the mask properly, the posture judgment part marks the passenger posture information as reminding event information and transmits the reminding event information to the terminal broadcast system.

The information calculation part uses the Euler video magnification technology to magnify a face of the passenger in the video information. Based on a time series of color changes at pixels, color changes within a specific time range are magnified, and the linear Euler video magnification algorithm is used to perform Fourier transform to obtain human skin color saturation. Based on changes in blood vessels and skin colors, a linear relationship between the skin temperature and the skin color saturation is established, thereby obtaining a facial skin temperature $T_f$ of the human body. When $T_f \geq 37.3°$ C., the information calculation part marks the facial skin temperature as warning event information and transmits the warning event information to a voice warning part and a video-image broadcast part of the terminal broadcast system.

3. The Terminal Control System

The terminal control system includes an air curtain opening-closing judgment part and a supply air angle adjustment part. The terminal control system is configured to control the supply air box 3 by acquiring the safety state information and correction information of fluctuations of the return air volume.

Specifically, the air curtain opening-closing judgment part is configured to receive the safety state information transmitted by the safety judgment part of the information processing system. The air curtain opening-closing judgment part is further configured to turn on or turn off the supply air box 3 based on the safety state information; when the safety state information is "dangerous state", the air curtain judgment part turns on the supply air box 3; and when the safety state information is "safe state", the air curtain judgment part turns off the supply air box 3.

Figure 4:
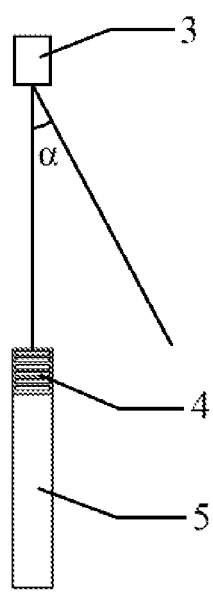
FIG. 4 illustrates a schematic diagram of a supply air angle of the air curtain.

The supply air angle adjustment part is configured to receive the correction event information transmitted by the return air volume monitoring part of the information processing system. The supply air angle adjustment part is further configured to adjust a supply air angle $\alpha$ of the supply air box 3, and the supply air angle $\alpha$ of the supply air box 3 is shown in FIG. 4.

In an embodiment, the supply air angle $\alpha$ of the supply air box 3 is in a range of 0°~30°.

4. The Terminal Broadcast System

The terminal broadcast system includes the voice broadcast part 2, the voice warning part, and the video-image broadcast part.

Specifically, the voice broadcast part 2 is configured to receive the reminding event information transmitted by the posture judgment part of the information processing system. The voice broadcast part 2 is further configured to broadcast a voice message "Please wear a mask properly" based on the reminding event information.

The voice warning part is configured to receive the warning event information transmitted by the information calculation part of the information processing system. The voice warning part is further configured to broadcast a voice message "Abnormal body temperature" to the driver based on the warning event information.

The video-image broadcast part is configured to receive the warning event information transmitted by the information calculation part of the information processing system. The voice warning part is further configured to broadcast image and video information of passenger features corresponding to the warning event information to the driver.

In an embodiment, the voice broadcast part and the voice warning part can be an on-board player containing programs and the video-image broadcast part can be an on-board liquid crystal display (LCD).

The bus driver promptly detects and prevents feverish passengers from boarding the bus based on the voice messages and video playback of the terminal broadcast system, which avoids passengers with abnormal body temperature from taking the bus for travel, thereby achieving the purpose of protecting the health and safety of the bus driver and the passengers during the epidemic prevention and control period.

Figure 2:
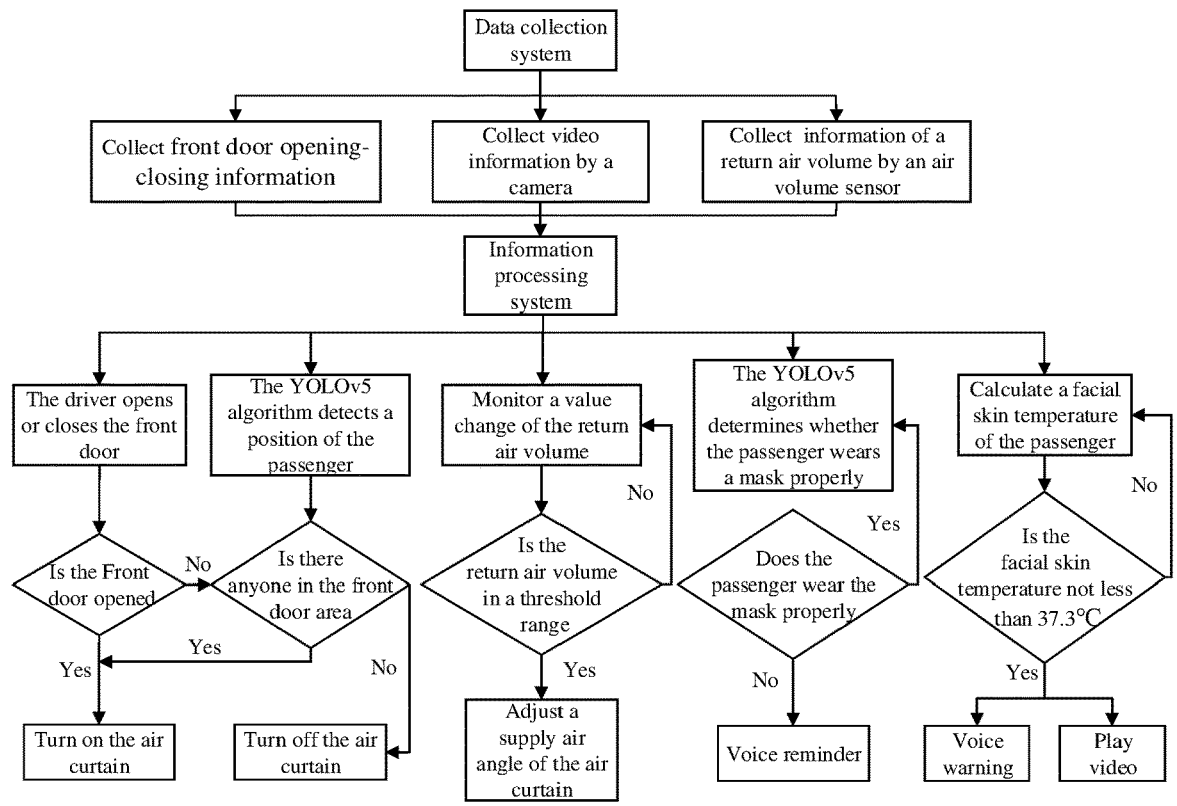
FIG. 2 illustrates a flowchart of the intelligent air curtain system for buses based on computer vision technology of the disclosure.
Figure 3:
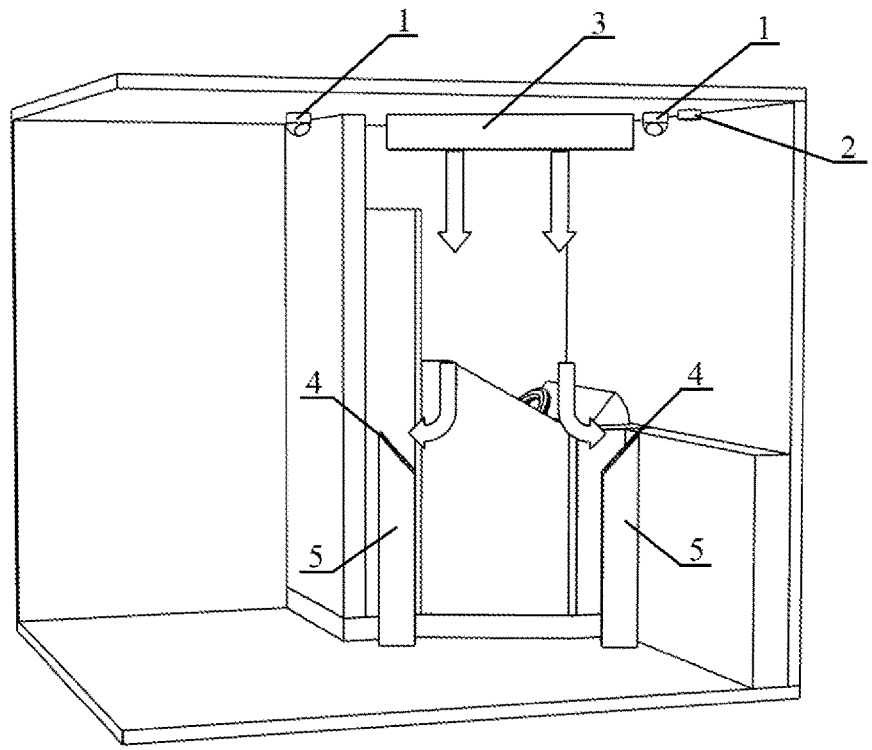
FIG. 3 illustrates a schematic structural diagram of the intelligent air curtain system for buses.

As shown in FIG. 2, the disclosure provides a flowchart and an implementation method of the intelligent air curtain system for buses based on computer vision technology.

When the bus reaches a bus stop, the bus driver manually opens the front door by electronic signals based on a personnel situation at the bus stop. When the driver opens the front door, the supply air box 3 is turned on, at the same time, the camera and the air volume sensor of the data collection system start to acquire parameters and send the parameters to the information processing system. The information storage part starts to store passenger video information acquired by the camera.

The object detection part receives video information transmitted by the information storage part. The object detection part uses the YOLOv5 object detection algorithm to detect and judge newly boarded passengers in real-time in the video information. The object detection part transmits detected object information to the safety judgment part.

Based on the electronic signals generated for opening and closing the front door and the detected object information transmitted by the object detection part, the safety judgment part can determine the safety state information of the bus driver. Specifically, when the front door is opened, the safety judgment part determines that the driver is in a dangerous state. When the front door is closed and somebody is standing in the front door area, the safety judgment part determines that the driver is in a dangerous state. When the front door is closed and nobody is standing in the front door area, the safety judgment part determines that the driver is in a safe state. Then the safety judgment part transmits the safety state information to the air curtain judgment part of the terminal control system. The air curtain judgment part controls the air curtain based on the safety state information; when the driver is in the dangerous state, the air curtain is turned on; and when the driver is in the safe state, the air curtain is turned off.

The micro air volume sensor provided in the return air box 5 transmits the values of the return air volume in real-time to the return air volume monitoring part, and the return air volume monitoring part starts to work after receiving a signal generated to turn on the supply air box 3. When the return air volume monitored by the return air volume monitoring part is not in a preset threshold range, the return air volume is marked as correction event information and the correction event information is transmitted to the supply air angle adjustment part of the terminal control system. The supply air angle adjustment part controls louvers of the supply air box 3 to adjust the supply air angle $\alpha$. When the return air volume is in the preset threshold range, the supply air box 3 is turned off.

The posture judgment part receives the video information transmitted by the information storage part and uses the YOLOv5 object detection algorithm to judge the passenger posture information; when the passenger does not wear the mask or does not wear the mask properly, the passenger posture information is marked as the reminding event information and the reminding event information is transmitted to the terminal broadcast system, and the voice broadcast part immediately broadcasts a voice message "Please wear a mask properly".

The information calculation part receives the passenger video information transmitted by the information storage part and uses the Euler video magnification technology to identify a facial skin temperature $T_f$ of the passenger. When the facial skin temperature $T_f$ of the passenger is greater than or equal to 37.3° C., the facial skin temperature is marked as warning event information, and the information calculation part transmits the warning event information to the voice warning part of the terminal broadcast system. The information calculation part captures facial feature images of the passenger and transmits them to the video-image broadcast part of the terminal broadcast system. After the terminal broadcast system receives the warning event information transmitted by the information calculation part, the voice warning part broadcasts a voice message "Abnormal body temperature" to the bus driver, and the video-image broadcast part displays the facial feature images of the passenger corresponding to the warning event information to the driver by the on-board LCD.

These parts can be implemented through hardware or a combination of software and hardware, and their specific structures are well-known to those skilled in the art. The specific structures will not be elaborated here.

What is claimed is:

1. An intelligent air curtain system for buses based on computer vision technology, comprising: a data collection system, an information processing system, a terminal control system, and a terminal broadcast system;

wherein the data collection system is configured to collect real-time information comprising front door opening-closing information of a bus, passenger video information in a front door area of the bus, and information of a return air volume of a return air box of an air curtain; the data collection system is further configured to transmit the real-time information to the information processing system; and the passenger video information comprises passenger position information and passenger posture information;

the information processing system comprises an object detection part, a safety judgment part, a return air volume monitoring part, a posture judgment part, and an information calculation part; the object detection part is configured to detect the passenger position information in the front door area of the bus in the passenger video information and transmit the passenger position information to the safety judgment part; the safety judgment part is configured to receive the front door opening-closing information, receive the passenger position information transmitted by the object detection part, determine safety state information of a driver of the bus based on the front door opening-closing information and the passenger position information, and transmit the safety state information comprising a safe state and a dangerous state to the terminal control system; the return air volume monitoring part is configured to receive the information of the return air volume transmitted by an air volume sensor in the return air box, monitor a value change of the return air volume in real-time, mark the return air volume as correction event information when the return air volume is not in a preset threshold range, and transmit the correction event information to the terminal control system; the posture judgment part is configured to determine the passenger posture information indicating that a passenger in the front door area does not wear a mask or does not wear the mask properly in the passenger video information, and the posture judgment part is further configured to mark the passenger posture information as reminding event information and transmit the reminding event information to the terminal broadcast system; and the information calculation part is configured to calculate a facial skin temperature of the passenger in the front door area, mark the facial skin temperature as warning event information when the facial skin temperature is greater than or equal to a preset value, and transmit the warning event information to the terminal broadcast system;

the terminal control system comprises an air curtain opening-closing judgment part and a supply air angle adjustment part; the air curtain opening-closing judgment part is configured to receive the safe state or the dangerous state transmitted by the information processing system, and turn off or turn on the air curtain; and the supply air angle adjustment part is configured to receive the correction event information transmitted by the information processing and adjust a supply air angle of the air curtain based on the correction event information; and the terminal broadcast system is configured to receive the reminding event information and the warning event information transmitted by the information processing system, and perform broadcasting based on the reminding event information and the warning event information.

2. The intelligent air curtain system for buses based on computer vision technology as claimed in claim 1, wherein the information collection system comprises a front door opening-closing collection part, a camera, the air volume sensor, and an information storage part;

the front door opening-closing collection part is configured to collect the front door opening-closing information, and transmit the front door opening-closing information to the information processing system; the camera is configured to capture the passenger video information in the front door area of the bus and transmit the passenger video information to the information storage part; the air volume sensor is configured to collect the information of the return air volume of the return air box after the air curtain is turned on, and transmit the information of the return air volume to the information processing system; and the information storage part is configured to store the passenger video information in the front door area of the bus and transmit the passenger video information to the information processing system.

3. The intelligent air curtain system for buses based on computer vision technology as claimed in claim 1, wherein the object detection part is configured to detect the passenger position information in real-time in the passenger video information based on an object detection algorithm and transmit the passenger position information to the safety judgment part.

4. The intelligent air curtain system for buses based on computer vision technology as claimed in claim 1, wherein the safety judgment part is further configured to:

when the front door opening-closing information indicates that the front door is opened, determine the safety state information of the driver as the dangerous state;

when the front door opening-closing information indicates that the front door is closed and there is a passenger standing in the front door area, determine the safety state information of the driver as the dangerous state; and when the front door opening-closing information indicates that the front door is closed and there is no passenger standing in the front door area, determine the safety state information of the driver as the safe state.

5. The intelligent air curtain system for buses based on computer vision technology as claimed in claim 1, wherein the posture judgment part is configured to use an object detection algorithm to determine the passenger posture information indicating that a passenger in the front door area does not wear the mask or does not wear the mask properly in the passenger video information, the posture judgment part is further configured to mark the passenger posture information as the reminding event information when the passenger does not wear the mask or does not wear the mask properly and transmit the reminding event information to the terminal broadcast system.

6. The intelligent air curtain system for buses based on computer vision technology as claimed in claim 1, wherein the information calculation part is configured to use video magnification technology to magnify a face of the passenger in the passenger video information and calculate the facial skin temperature of the passenger; the information calculation part is further configured to mark the facial skin temperature as the warning event information when the facial skin temperature is greater than or equal to the preset value, and transmit the warning event information to the terminal broadcast system; and the preset value is 37.3 Celsius degrees (° C.).

7. The intelligent air curtain system for buses based on computer vision technology as claimed in claim 1, wherein the air curtain opening-closing judgment part is configured to turn on the air curtain based on the dangerous state transmitted by the information processing system, and the air curtain opening-closing judgment part is further configured to turn off the air curtain based on the safe state transmitted by the information processing system.

8. The intelligent air curtain system for buses based on computer vision technology as claimed in claim 1, wherein the terminal broadcast system comprises a voice broadcast part, a voice warning part, and a video-image broadcast part;
the voice broadcast part is configured to receive the reminding event information transmitted by the information processing system and broadcast a voice message "Please wear a mask properly" based on the reminding event information;
the voice warning part is configured to receive the warning event information transmitted by the information processing system and broadcast a voice message "Abnormal body temperature" to the driver based on the warning event information; and
the video-image broadcast part is configured to broadcast image and video information of passenger features corresponding to the warning event information to the driver.

* * * * *